United States Patent
Goren

(10) Patent No.: US 7,640,024 B2
(45) Date of Patent: Dec. 29, 2009

(54) LOCATION TRACKING USING DIRECTIONAL ANTENNAS COMBINED WITH SIGNAL STRENGTH MEASUREMENTS

(75) Inventor: David P. Goren, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 898 days.

(21) Appl. No.: 10/748,988

(22) Filed: Dec. 30, 2003

(65) Prior Publication Data

US 2005/0159154 A1    Jul. 21, 2005

(51) Int. Cl.
*H04W 24/00* (2006.01)
*H04M 1/00* (2006.01)

(52) U.S. Cl. ............... 455/456.1; 455/456.5; 455/562.1

(58) Field of Classification Search ... 455/456.1–456.6, 455/404.2, 414.2, 446, 562.1; 342/432, 450, 342/463; 340/573.1
See application file for complete search history.

(56) References Cited

U.S. PATENT DOCUMENTS

| | | | | |
|---|---|---|---|---|
| 5,218,367 | A * | 6/1993 | Sheffer et al. | 342/457 |
| 5,406,275 | A * | 4/1995 | Hassett et al. | 340/933 |
| 5,455,851 | A * | 10/1995 | Chaco et al. | 379/38 |
| 5,508,707 | A * | 4/1996 | LeBlanc et al. | 342/457 |
| 5,812,956 | A * | 9/1998 | Pregont | 455/562.1 |
| 5,832,363 | A * | 11/1998 | Moriya et al. | 455/11.1 |
| 5,945,948 | A * | 8/1999 | Buford et al. | 342/457 |
| 6,031,490 | A * | 2/2000 | Forssen et al. | 342/457 |
| 6,081,718 | A * | 6/2000 | Ando et al. | 455/447 |
| 6,307,475 | B1 * | 10/2001 | Kelley | 340/573.1 |
| 6,405,018 | B1 * | 6/2002 | Reudink et al. | 455/20 |
| 6,594,475 | B1 * | 7/2003 | Anvekar et al. | 455/277.1 |
| 6,611,231 | B2 * | 8/2003 | Crilly et al. | 342/378 |
| 6,700,493 | B1 * | 3/2004 | Robinson | 340/573.1 |
| 6,879,845 | B2 * | 4/2005 | Suzuki et al. | 455/562.1 |
| 6,909,893 | B2 * | 6/2005 | Aoki et al. | 455/422.1 |
| 6,978,124 | B2 * | 12/2005 | Benes et al. | 455/101 |
| 7,072,669 | B1 * | 7/2006 | Duckworth | 455/456.1 |
| 7,110,775 | B2 * | 9/2006 | Ogino et al. | 455/456.1 |
| 2002/0002066 | A1 * | 1/2002 | Pallonen | 455/562 |
| 2005/0032531 | A1 * | 2/2005 | Gong et al. | 455/456.5 |
| 2005/0035857 | A1 * | 2/2005 | Zhang et al. | 340/539.13 |
| 2005/0200476 | A1 * | 9/2005 | Forr et al. | 340/539.13 |

OTHER PUBLICATIONS

Copending U.S. Appl. No. 09/528,697, filed Mar. 17, 2000.
*Enhancements to the User Location and Tracking System*, by Paramvir Bahl and Venkata N. Padmanabhan, Microsoft Technical Report MSR-TR-99-12, dated Feb. 1999, published by Microsoft Research.
*User Location and Tracking in an In-Building Radio Network*, by Paramvir Bahl and Venkata N. Padmanabhan, Microsoft Technical Report MSR-TR-99-12, dated Feb. 1999, by the same authors, published by Microsoft Research.

* cited by examiner

*Primary Examiner*—Duc M Nguyen

(57) ABSTRACT

A wireless local area network has mobile units which are provided with radios for transmitting and receiving data communications messages between the mobile units and fixed access points. The mobile units are located using signal strength for radio communications between the mobile units and the access points. At least some of the access points are provided with antennas having antenna patterns with selected pattern shape for enhancing location of the mobile units.

7 Claims, 2 Drawing Sheets

LOCATION TRACKING USING DIRECTIONAL ANTENNAS COMBINED WITH SIGNAL STRENGTH MEASUREMENTS

BACKGROUND OF INVENTION

The present invention relates to electronic location systems and particularly to systems which use signal strength measurements to locate mobile units in a wireless communications system, such as a wireless data communications system using the protocol of IEEE Standard 802.11, for example. A system of this type is described in articles entitled Enhancements to the User Location and Tracking System, by Paramvir Bahl and Venkata N. Padmanabhan, and User Location and Tracking in an In-Building Radio Network, Microsoft Technical Report MSR-TR-99-12, dated February 1999, by the same authors, both published by Microsoft Research.

An exemplary system wherein object location using signal strength measurements, or signal strength measurements in combination with other signal characteristics, such as time of arrival, angle of arrival and time difference of arrival, is illustrated in FIG. 1 which shows a computer 12, connected to access points 20A to 20F over wired network 14. The location of Mobile Unit 22 which communicates with computer 12 via access points 20 can be determined by measuring the signal strength at the access points or the signal strength of signals from access points 20A to 20F as received by the mobile unit 22. The computer 12, or a processor in the mobile unit 22, includes a database 16, which maps signal strength to location within the area covered by the system. Location of mobile unit 22 can be determined by comparing signal strength for signals between mobile unit 22 and a selected plurality of access points to the corresponding signal strengths in the database 16.

In most wireless data communications systems, the type and location of access point antennas are chosen to provide maximum area of radio signal transmission for the communications function. Thus, omni-directional antennas are frequently used and the antennas are located near the ceilings of a facility, away from walls, in a grid-like pattern. While this arrangement is beneficial for communications coverage, it may not be the best arrangement for locating mobile units based on signal strength. The inventors have discovered that, for location systems, directional antennas that have a large variation of signal strength to location can give better location results.

In co-pending application Ser. No. 09/528,697, filed Mar. 17, 2000, which is incorporated herein by reference, there is described a system which follows the protocol of IEEE Standard 802.11, but which uses a combination of RF Ports and Cell Controllers to perform the functions of Access points of a classical 802.11 data communications system. Lower level MAC functions are performed by the RF Ports and higher level MAC functions, including association and roaming functions, are performed by the cell controller. The term "access point" as used herein is intended to include conventional access points, such as those which follow the protocol of IEEE Standard 802.11 and perform all MAC functions, as well as RF Ports operating with cell controllers, as described in the incorporated co-pending application.

It is therefore an object of the invention to provide an improvement in a wireless communications system arranged to provide location of mobile units using signal strength measurements.

SUMMARY OF THE INVENTION

The present invention is an improvement in a wireless local area network wherein mobile units are provided with radios for transmitting and receiving communications between the mobile units and fixed access points, and wherein the mobile units are located using signal strength for radio communications between the mobile units and the access points. At least some of the access points are provided with antennas having antenna patterns with selected pattern shape for enhancing location of the mobile units.

In preferred arrangements the selected pattern shapes include horizontally offset directional antenna patterns. The horizontally offset patterns may be offset in angular direction or in horizontal position. Some of the access points may include multibeam antennas to provide patterns offset in angular direction. The access points are advantageously arranged on the periphery of a facility. The antennas may be arranged at selected heights to enhance variation in signal strength with position. Horizontally offset beams may be arranged to coincide with the aisles of a facility.

For a better understanding of the present invention, together with other and further objects thereof, reference is made to the following description, taken in conjunction with the accompanying drawings, and its scope will be pointed out in the appended claims.

DESCRIPTION OF THE PREFERRED EMBODIMENTS

Figure 2:
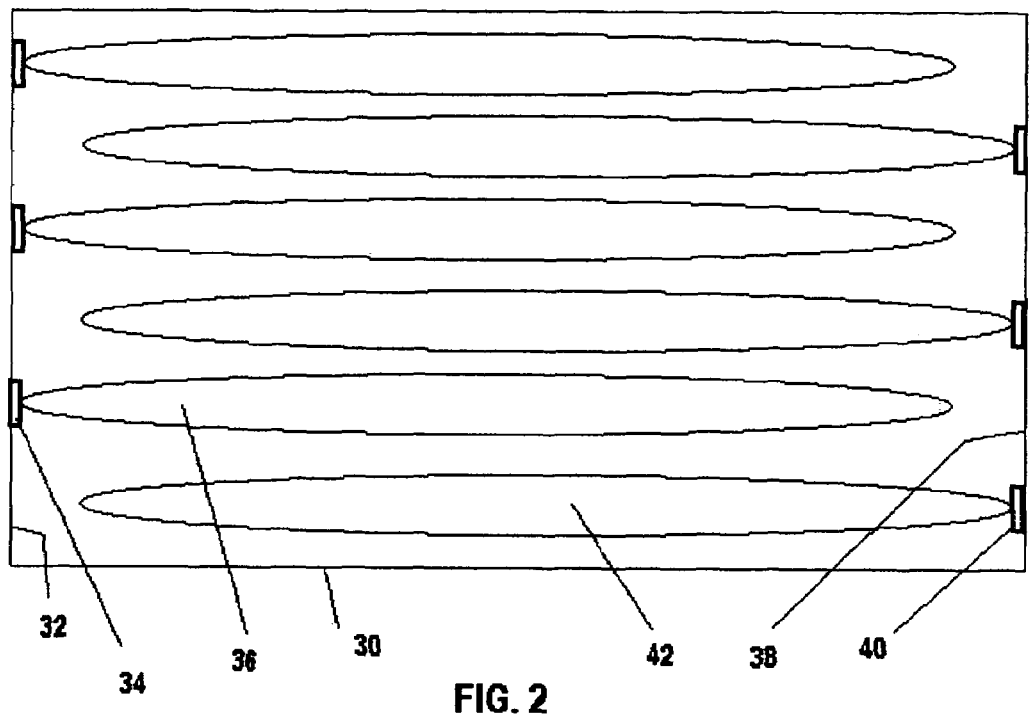
FIG. 2 shows a first example of directional antenna patterns for practicing the present invention.

Referring to FIG. 2 there is shown a first example of an access point and antenna arrangement for a wireless data communications and location system according to the present invention. The arrangement of FIG. 2 shows a top view of antenna patterns for access points arranged on the walls of a rectangular facility 30, such as a warehouse. Three access point antennas 34 are arranged on left wall 32 and radiate directional beams 36 across the facility 30. Three access point antennas 40 are arranged in interleaved pattern on opposite wall 38 and radiate directional patterns 42 which are arranged between patterns 36. It will be understood that as used herein the terms "radiate" and "antenna beams" are intended to include the reciprocal functions of "receive" and "beam of sensitivity" since the operation of such antennas is usually reciprocal.

In the arrangement depicted in FIG. 2 the antenna beams are horizontally offset. Accordingly as a mobile unit or other mobile device which is to be tracked moves across the facility 30 in a direction from top to bottom in the view of FIG. 2, the signal strength of signals received from the access points varies rapidly with distance traveled, since the movement is across the antenna beams. Additionally movement of a mobile unit from left to right also causes a rapid variation in signal strength for signals received from access points 34 on wall 32 with respect to signals received from access points 40 on wall 38, since the motion is directly away from access points 34 and directly toward wall 38. Accordingly there is achieved a large variation of signal strength as a function of position in both directions within facility 30, which results in increased sensitivity and greater accuracy for a signal strength location system given the same signal-to-noise ratio.

As an alternative it is also possible to provide access points or other signal emitters on the remaining walls (top and bottom of FIG. 2) of facility 30 and provide a set of oppositely directed antenna beams that are transverse to beams 36 and 42.

The arrangement of antennas 34, 40 illustrated in FIG. 2 may additionally be arranged to coincide with aisles in a warehouse or retail facility, wherein location of a mobile unit within a particular aisle is important for the purposes of the functions to be performed by the system. By using directional antenna beams that coincide with the aisles of the facility it becomes highly unlikely that a mobile unit will be identified as being located in an incorrect aisle.

Figure 3:
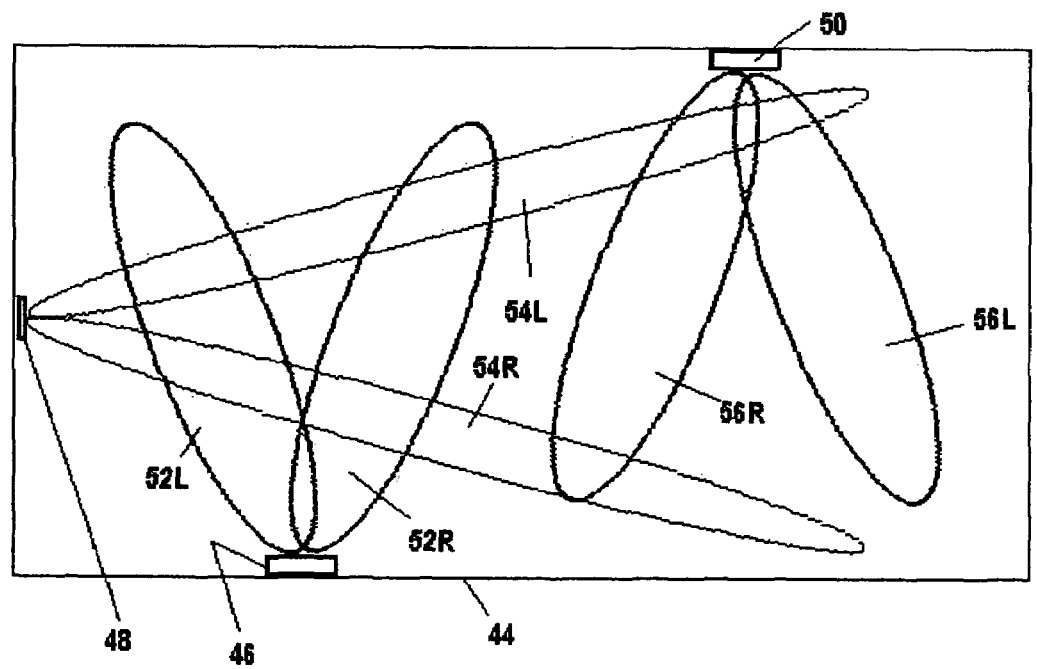
FIG. 3 shows a second example of directional antenna patterns for practicing the present invention.

FIG. 3 shows an alternate embodiment of the arrangement according to the invention wherein, rather than being horizontally offset in position, the antenna beams are offset in angular direction. In FIG. 3 rectangular facility 44 includes access points 46, 48 and 50 mounted on three walls. Each of access points 46, 48, 50 has two angularly offset antenna beams 52L, 52R, 54l, 54R, 56L and 56 R, which may be associated with two access point transmitter/receiver circuits to provide two access points, or may be switched between a single circuit for navigation purposes. Those skilled in the art will recognize that there is a large degree of variation in the ratio of the signal strength received by a mobile unit as a function of movement in a direction which crosses the two beams of each access point, and hence a greater sensitivity to position in this direction. Since access point 48 is oriented to radiate in beam directions whose boresight is perpendicular to the boresight directions for access points 46 and 50, sensitivity is achieved in two coordinate directions.

Figure 1:
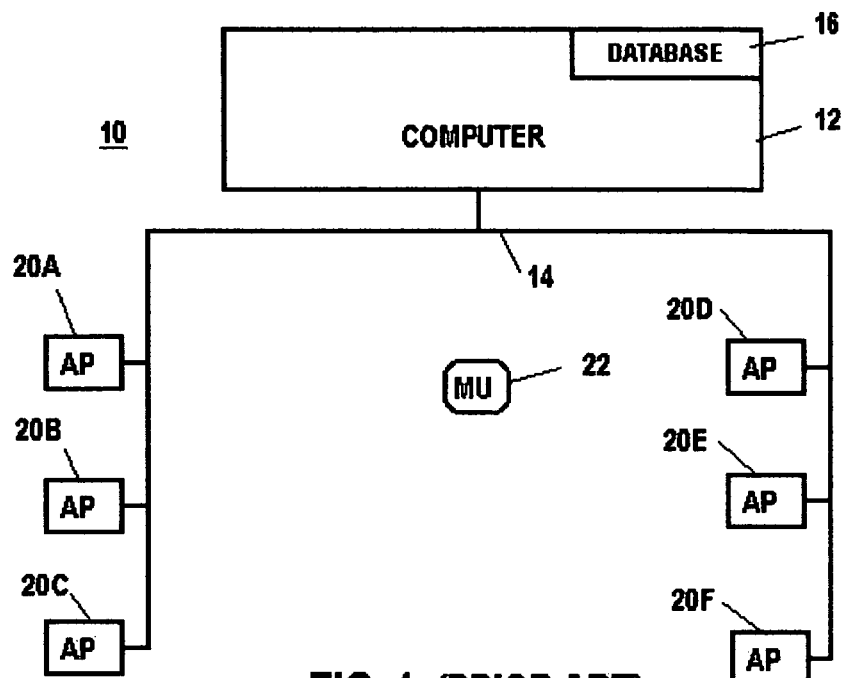
FIG. 1 is a block diagram showing a wireless data communications system in accordance with the prior art.
Figure 4:
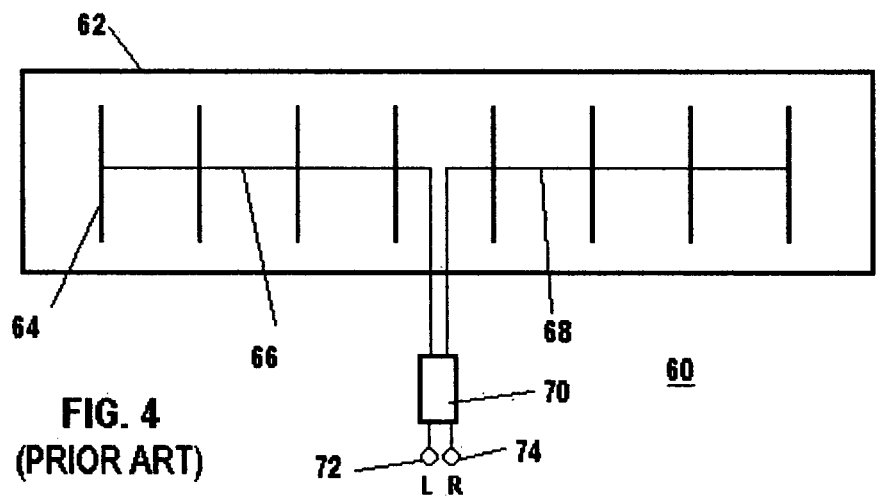
FIG. 4 illustrates a first example of a known directional antenna useful for practicing the present invention.

FIG. 4 shows a first exemplary antenna 60 that may be used in connection with the arrangement of the present invention. Antenna 60 is a horizontal linear array of dipoles 64, which may, for example, be mounted on a substrate 62, and may include a planar reflector. Transmission lines 66 and 68 provide signals to/from dipoles 64. In practicing the embodiment of FIG. 2 transmission lines 66 and 68 are connected to provide signals to/from all dipoles in phase to cause the array to radiate a narrow antenna beam in a boresight direction that is perpendicular to the plane of the dipole array. In connection with practicing the arrangement of FIG. 3, transmission lines 66 and 68 are connected to a 3 dB. directional coupler 70, in a manner well known, to provide antenna beams at terminals 72 and 74 that are horizontally offset from the boresight direction of antenna 60.

Figure 5:
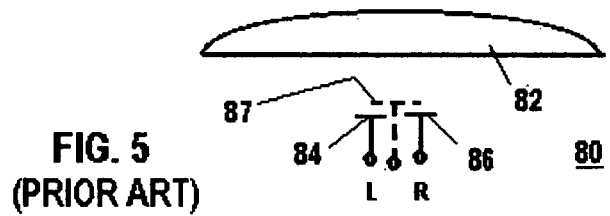
FIG. 5 illustrates a second example of a known directional antenna useful for practicing the present invention.

FIG. 5 shows an alternate directional antenna 80 that can be used in the arrangement of the present invention. Antenna 80 consists of parabolic reflector 82 and one or more feed elements arranged at or near the parabolic focal point for illuminating reflector 82 with energy. Reflector 82 may be a two dimensional parabolic shape or may be a cylindrical parabola. Alternately a circular or spherical reflector can be used. Feed elements 84 and 86, shown as dipoles can be offset from the focal point to provide angularly offset beams which can be used in the arrangement of FIG. 3. Alternately a single dipole feed element 87 may be provided at the focal point to provide a single directional beam for use in the arrangement of FIG. 2.

In still another arrangement according to the invention directional antennas, such as patch antennas can be located on the ceiling of a facility and have beams directed toward the ground. This arrangement gives greater variation in signal strength between antennas than the conventional omnidirectional antennas mounted on a ceiling since movement between antennas gives greater variation in signal strength in the same manner as the arrangement illustrated in FIG. 2.

In accordance with an aspect of the invention the height of an antenna may be adjusted to enhance location determination. In a conventional WLAN installation antennas are usually placed at or near the ceiling of a facility to obtain maximum range of coverage. In contrast providing antennas at lower heights, such as on walls, partitions or support columns of a facility will reduce antenna range, but increase variation of signal strength with location.

While there have been described what are believed to be the preferred embodiments of the invention, those skilled in the art will recognize that other and further changes and modifications may be made thereto without departing from the spirit of the invention, and it is intended to claim all such changes and modifications as fall within the true scope of the invention.

I claim:

1. In a wireless local area network wherein mobile units are provided with radios for transmitting and receiving data communications messages between said mobile units and fixed access points, and wherein said mobile units are located using signal strength for radio communications between said mobile units and said access points, a system wherein at least some of said access points are provided with antennas having antenna patterns with selected pattern shape for enhancing location of said mobile units, said selected pattern shapes include horizontally offset non-intersecting directional antenna patterns, and wherein a first group of said access points are arranged in an opposing interleaved pattern relative to a second group of said access points.

2. The system as recited in claim 1 wherein said horizontally offset directional beams are horizontally offset in position.

3. The system as recited in claim 2 wherein at least some of said antennas are mounted near the periphery of a facility.

4. The system as recited in claim 2 wherein said directional beams are offset in position to correspond to aisles in a facility.

5. The system as recited in claim 1 wherein said antennas are located at selected heights for achieving said selected pattern shapes.

6. The system as recited in claim 1 wherein an axis of each of said directional antenna patterns are arranged in parallel relation to one another.

7. The system as recited in claim 1 wherein a first group of said directional antenna patterns radiate between a second group of said directional antenna patterns.

* * * * *

UNITED STATES PATENT AND TRADEMARK OFFICE
CERTIFICATE OF CORRECTION

| | | |
|---|---|---|
| PATENT NO. | : 7,640,024 B2 | Page 1 of 1 |
| APPLICATION NO. | : 10/748988 | |
| DATED | : December 29, 2009 | |
| INVENTOR(S) | : Goren | |

It is certified that error appears in the above-identified patent and that said Letters Patent is hereby corrected as shown below:

IN THE SPECIFICATION

1. In Column 1, Line 6, delete "OF" and insert -- OF THE --, therefor.

2. In Column 2, Line 46, delete "DESCRIPTION" and insert -- DETAILED DESCRIPTION --, therefor.

Signed and Sealed this

Eighth Day of November, 2011

David J. Kappos
*Director of the United States Patent and Trademark Office*